US012679248B2

(12) United States Patent
Quix et al.

(10) Patent No.: US 12,679,248 B2
(45) Date of Patent: Jul. 14, 2026

(54) ADVANCED POWER ELECTRONIC CIRCUIT FOR FUEL CELL VEHICLES ENABLING INDEPENDENT COOLING OF VARIOUS SYSTEMS

(71) Applicant: FORD GLOBAL TECHNOLOGIES, LLC, Dearborn, MI (US)

(72) Inventors: Hans Guenter Quix, Herzogenrath (DE); Jan Mehring, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 588 days.

(21) Appl. No.: 18/213,438

(22) Filed: Jun. 23, 2023

(65) Prior Publication Data

US 2024/0008221 A1      Jan. 4, 2024

(30) Foreign Application Priority Data

Jul. 1, 2022    (DE) .......................... 102022116476.4

(51) Int. Cl.
| | |
|---|---|
| *B60L 58/33* | (2019.01) |
| *B60L 58/40* | (2019.01) |
| *H01M 8/04007* | (2016.01) |
| *H01M 8/04029* | (2016.01) |
| *H01M 8/04746* | (2016.01) |

(52) U.S. Cl.
CPC .............. *B60L 58/33* (2019.02); *B60L 58/40* (2019.02); *H01M 8/04029* (2013.01); *H01M 8/04067* (2013.01); *H01M 8/04768* (2013.01); *B60L 2210/10* (2013.01); *H01M 2250/20* (2013.01)

(58) Field of Classification Search
CPC ...... B60L 58/33; B60L 58/40; B60L 2210/10; B60K 11/02; B60K 11/04; H01M 8/04029; H01M 8/04067; H01M 8/04074; H01M 8/04768; H01M 2250/20
See application file for complete search history.

(56) References Cited

U.S. PATENT DOCUMENTS

| | | | |
|---|---|---|---|
| 10,356,962 B2 | 7/2019 | Li et al. | |
| 11,127,993 B2 | 9/2021 | King | |
| 11,198,346 B2 | 12/2021 | Blatchley et al. | |
| 11,214,114 B2 | 1/2022 | Smith et al. | |
| 2010/0273079 A1* | 10/2010 | Hinsenkamp | ..... H01M 8/04059 |
| | | | 429/442 |
| 2021/0188043 A1 | 6/2021 | Smith et al. | |
| 2022/0390323 A1* | 12/2022 | Sakamoto | ........... G01M 13/003 |
| 2023/0302963 A1* | 9/2023 | Tsikonis | ............ H01M 8/04029 |

* cited by examiner

*Primary Examiner* — Timothy Hannon
(74) *Attorney, Agent, or Firm* — David B. Kelley; Brooks Kushman P.C.

(57) ABSTRACT

An electrified vehicle and cooling system for an electrified vehicle include fuel cells and at least one first and one second coolant circuit, wherein the first coolant circuit is configured for cooling the fuel cells and the second coolant circuit is configured for cooling electronic components for controlling the fuel cells and for cooling electronic components of an electric drive system, wherein the second coolant circuit has a first partial coolant circuit and a second partial coolant circuit, wherein the first partial coolant circuit is arranged in the region of the electronic components for controlling the fuel cells and the second partial coolant circuit is arranged in the region of the electronic components of the electric drive system.

15 Claims, 4 Drawing Sheets

ADVANCED POWER ELECTRONIC CIRCUIT FOR FUEL CELL VEHICLES ENABLING INDEPENDENT COOLING OF VARIOUS SYSTEMS

CROSS-REFERENCE TO RELATED APPLICATIONS

This application claims foreign priority benefits under 35 U.S.C. § 119(a)-(d) to DE Application 10 2022 116 476.4 filed Jul. 1, 2022, which is hereby incorporated by reference in its entirety.

TECHNICAL FIELD

The disclosure relates to a cooling system for a vehicle having fuel cells, to a corresponding vehicle, and to a method for operating the cooling system.

BACKGROUND

Electrically powered vehicles that draw energy from fuel cells are also referred to as FCEVs (fuel cell electric vehicles). The electrical energy is either used directly by an electric drive or is temporarily stored in a drive battery. FCEVs have numerous electronic components that are provided for controlling the electric drive system and for controlling the fuel cells. Said components are commonly cooled in a coolant circuit. This however has the disadvantage that the cooling of individual components cannot be adapted to the present requirements. Thus, under some circumstances, certain components are cooled when this is not required.

SUMMARY

A first aspect of the disclosure relates to a cooling system for an electrically powered vehicle having fuel cells, which cooling system has at least one first coolant circuit, having a first pump, and one second coolant circuit, wherein the first coolant circuit is arranged for the purposes of cooling the fuel cells and the second coolant circuit is arranged for the purposes of cooling electronic components for controlling the fuel cells and for the purposes of cooling electronic components of the electric drive system. The cooling system is characterized in that the second coolant circuit has a first partial coolant circuit and a second partial coolant circuit, wherein the first partial coolant circuit is arranged for the purposes of cooling the electronic components for controlling the fuel cells and the second partial coolant circuit is arranged for the purposes of cooling the electronic components of the electric drive system.

The cooling system according to the disclosure advantageously allows variable cooling of different electronic components. Here, in a manner dependent on the operating situation, particular components of the power electronics can be cooled, and energy for cooling other components can be saved.

The arrangement of the first cooling circuit for the purposes of cooling the fuel cells and of the second coolant circuit, or of the first and second partial coolant circuits, for the purposes of cooling electronic components means that the coolant circuits run in the respective region of said parts so as to be able to dissipate heat from these regions.

A first pump may be arranged in the first partial coolant circuit and a second pump is arranged in the second partial coolant circuit. The first partial coolant circuit and the second partial coolant circuit can thus each be operated using a dedicated pump. In this way, a coolant flow can be selectively provided in a partial coolant circuit in which cooling is required, whilst no cooling is implemented in the other partial coolant circuit. It is however also possible for a coolant flow to be provided in both partial circuits.

A first check valve may be arranged in the cooling system between the inlet of the first partial coolant circuit and that of the second partial coolant circuit. This advantageously counteracts a backflow of coolant from the second partial coolant circuit into the first partial coolant circuit, which could adversely affect the efficiency of the cooling.

A second check valve may be arranged in the cooling system between the outlet of the first partial coolant circuit and that of the second partial coolant circuit. This advantageously counteracts a backflow of coolant from the second partial coolant circuit into the first partial coolant circuit, which could adversely affect the efficiency of the cooling.

A throttle may be arranged in the first partial coolant circuit in the region of an energy distributing unit. The throttle is provided for adjusting the coolant flow in the first partial coolant circuit, such that all electronic components therein can advantageously be uniformly cooled.

In one or more embodiments, the first coolant circuit is a high-temperature circuit, and the second coolant circuit is a low-temperature circuit. The fuel cells reach significantly higher temperatures, and must therefore be cooled much more intensely, than the electronic components of the electric drive and of the fuel cell controller. The two cooling circuits are separate from one another. The heat is dissipated using dedicated coolers or heat exchangers.

A second aspect of the disclosure relates to a vehicle having fuel cells and an electric drive, which vehicle has a cooling system according to the disclosure. The advantages of the vehicle correspond to the advantages of the cooling system according to the disclosure.

A third aspect of the disclosure relates to a method for cooling various electric and electronic components of a vehicle associated with controlling a fuel cell, and electric and electronic components associated with controlling an electric drive of the vehicle according to the disclosure, having the steps: detecting the component temperatures in the first partial coolant circuit and in the second partial coolant circuit, activating the first pump if the component temperatures in the first coolant circuit exceed a threshold value, and activating the second pump if the component temperatures in the second coolant circuit exceed a threshold value. The advantages of the method correspond to the advantages of the cooling system according to the disclosure.

In one or more embodiments, the cooling system is operated in a first operating state when, in the method, the first pump is driven and the second pump is not. In this case, the first partial coolant circuit is operated. In a second operating state, the second pump is driven and the first pump is not. In this case, the second partial coolant circuit is operated. In a third operating state, the first pump and the second pump are both driven. In this case, both partial circuits are operated.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
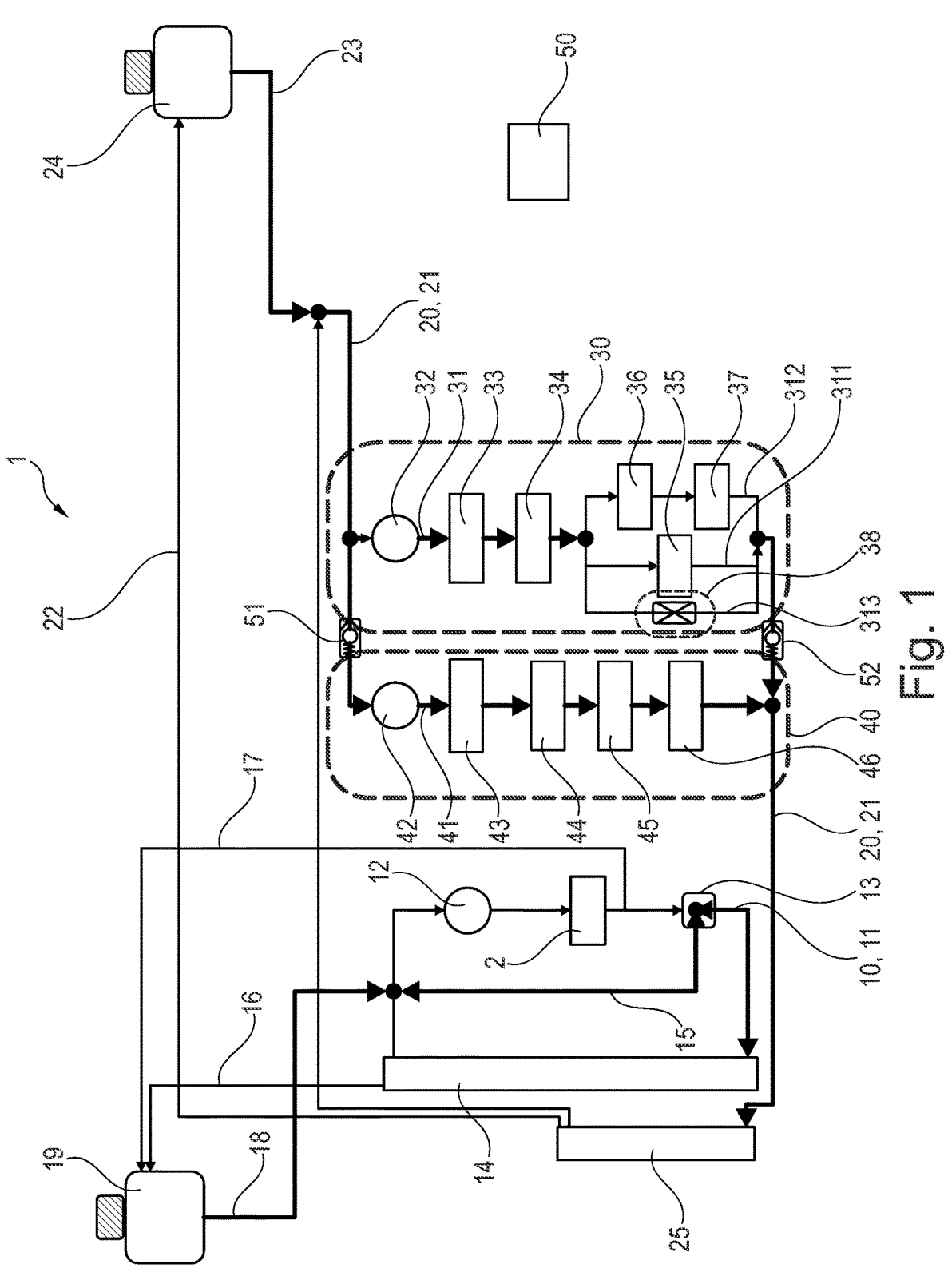
FIG. 1 is an illustration of an embodiment of a cooling system according to the disclosure.

FIG. 1 illustrates an arrangement of a cooling system 1 according to the disclosure. The cooling system 1 is arranged in an electrically powered vehicle having fuel cells 2. The fuel cells 2 serve for generating electrical energy that is provided to the electric drive of the vehicle. The fuel cells 2 are cooled by a first coolant circuit 10.

The first coolant circuit 10 is a high-temperature circuit. In the first coolant circuit 10, the coolant flows through a first coolant line 11. Here, the coolant is conveyed by a first pump 12. A three-way valve 13 with a temperature sensor, in other words a temperature-dependent three-way valve, is arranged in the first coolant line 11 downstream of the fuel cells 2. In a manner dependent on the temperature of the coolant, said coolant can be conducted through a first cooling radiator 14 or through a bypass line 15 past the first cooling radiator 14, which bypass line opens into the first coolant line 11 again downstream of the first cooling radiator 14. The first coolant circuit 10 is connected via a first expansion line 16, a second expansion line 17 and a third expansion line 18 to a first expansion tank 19.

Numerous electronic components are arranged in the vehicle for the purposes of controlling the fuel cells 2 and the electric drive. These electronic components are cooled by a second coolant circuit 20. The second coolant circuit 20 runs through a second coolant line 21 and is connected via a fourth expansion line 22 and a fifth expansion line 23 to a second expansion tank 24. The second coolant line 21 runs through a second cooling radiator 25. As per the illustration in FIG. 1, the second coolant line 21 branches upstream of the electronic components into two partial circuits, specifically a first partial coolant circuit 30 and a second partial coolant circuit 40. The two partial circuits 30, 40 are indicated in FIG. 1 by a respective dashed line.

The first partial coolant circuit 30 runs in the region of the electronic components that are provided for controlling the fuel cells 2. Arranged in a first partial coolant line 31 is a second pump 32 that conveys the flow of the coolant in the first partial coolant circuit 30. Downstream of the second pump 32 (in relation to the first partial coolant line 31), there are arranged a DC voltage converter for the fuel cell 33, a DC voltage converter for the battery 34, a power distributor unit for the fuel cell 35, a compressor control device 36, and an electrical compressor 37. Downstream of the DC voltage converter for the battery 34, the first partial coolant circuit 30 branches into three sections, such that the power distributor unit for the fuel cell 35 is arranged in a first section 311, and the compressor control device 36 and the electrical compressor 37 are arranged in a second section 312. Arranged in a third section 313 is a throttle device 38 that serves for regulating the coolant flow. Downstream of said devices, the sections 311, 312 and 313 merge again to form the first partial coolant line 31.

The second partial coolant circuit 40 runs in the region of the electric drive of the vehicle and of the electronic components for controlling the electric drive.

Arranged in a second partial coolant line 41 is a third pump 42 that conveys the flow of the coolant in the second partial coolant circuit 40. Downstream of the third pump 42, there are arranged a charging unit 43, a high voltage/low voltage DC voltage converter 44, an inverter 45, and an electric motor 46.

A first check valve 51 is arranged downstream of the point at which the first partial coolant line 31 branches from the second coolant line 21, or in other words at which the second coolant line 21 branches into the first partial coolant line 31 and second partial coolant line 41. A second check valve 52 is arranged upstream of the point at which the first partial coolant line 31 opens into the second partial coolant line 41 to form the second coolant line 21. The check valves 51, 52 serve for controlling the flow such that it is possible to prevent undesired operation of the first partial coolant circuit 31 when the second partial coolant circuit 41 is operated.

The pumps 12, 32, 42 are controlled by a control device 50. In the embodiment shown, the pumps 32 and 42 are of the same type, that is to say the pressure loss in the two partial coolant circuits 30 and 40 is approximately equal. If only the second pump 32 is active, then the first check valve 51 is automatically closed. It is thus not possible for any coolant to be "drawn in" from the partial coolant circuit 40. If only the third pump 42 is active, then the second check valve 52 is automatically closed. If both pumps 32, 42 are running, then both valves 51, 52 are open. If, for example in other embodiments, the pressure losses in the partial coolant circuits 30 and 40 are different, and pumps 32, 42 of different power are installed, it could be necessary for the valves 51 and 52 to be differently "tuned", for example with different cross sections and spring rates.

As coolant, a water-glycol mixture, or some other expedient coolant with which a person skilled in the art is familiar, is used in both circuits 10, 20.

Figure 2:
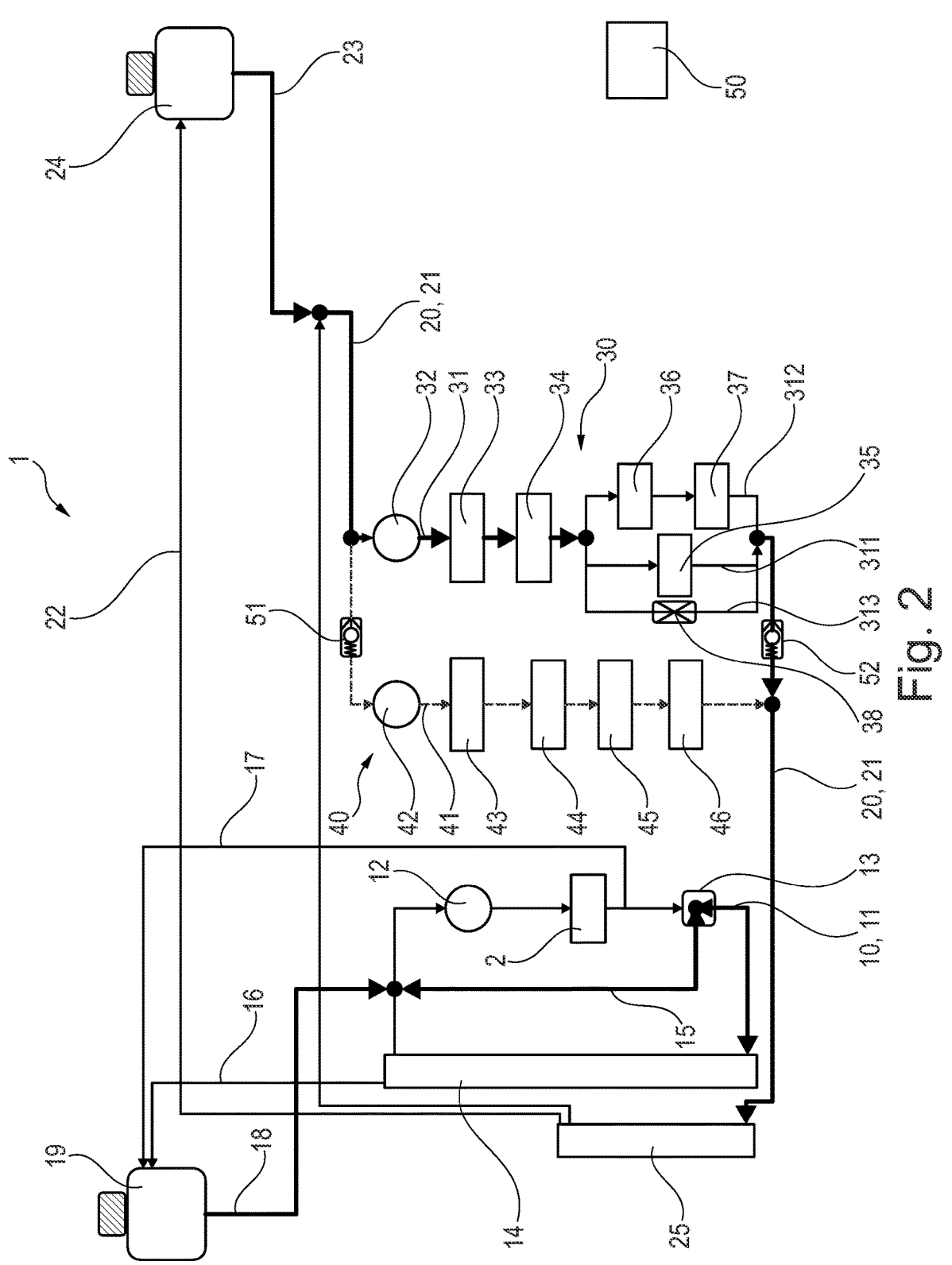
FIG. 2 shows the embodiment according to FIG. 1 in a first operating state.

FIG. 2 shows the cooling system 1 according to the disclosure in a first operating state in which the components of the first partial coolant circuit 30 are being cooled (indicated by a solid line for the first partial coolant line 31 and a dashed line for the second partial coolant line 41). The first operating state is implemented if only the electronic components provided for controlling the fuel cells 2 require cooling. For this purpose, the second pump 32 is activated by way of a signal from the control device 50. The third pump 42 remains inactive, such that no coolant flows through the second partial coolant circuit 40.

Figure 3:
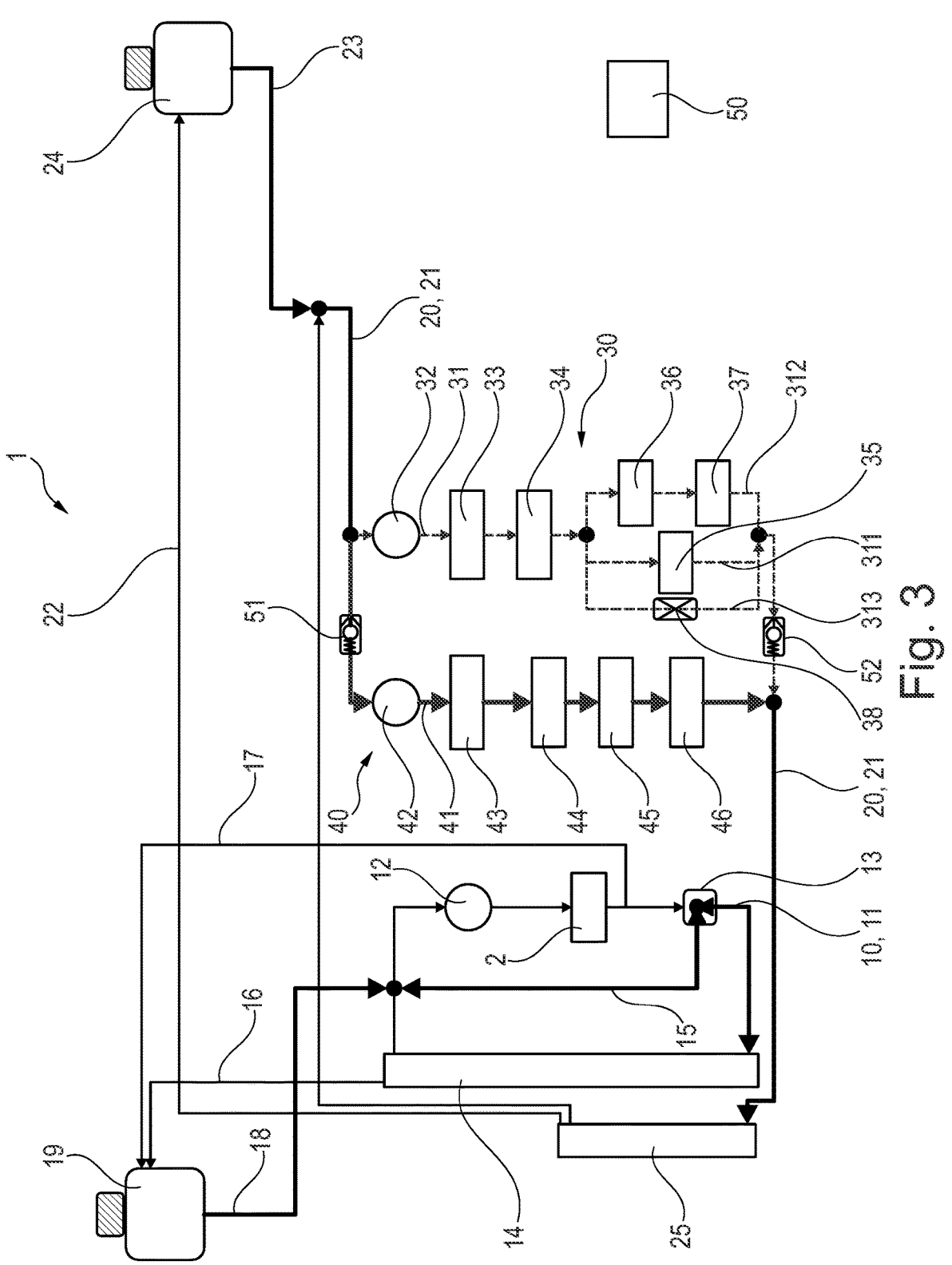
FIG. 3 shows the embodiment according to FIG. 1 in a second operating state.
Figure 4:
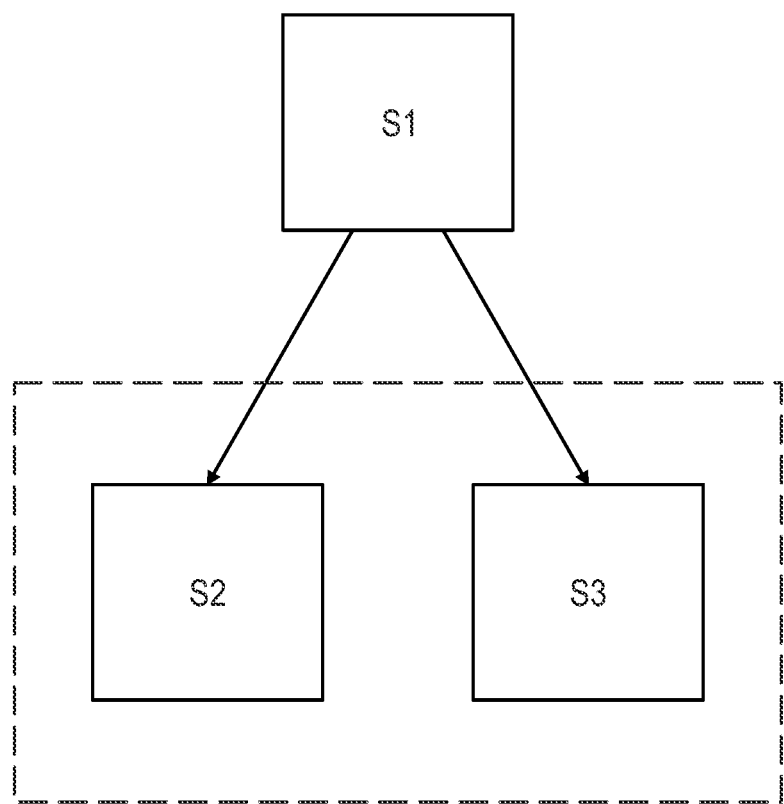
FIG. 4 shows a flow diagram of an embodiment of the method according to the disclosure.

FIG. 3 shows the cooling system 1 according to the disclosure in a second operating state in which the components of the second partial coolant circuit 40 are being cooled (indicated by a solid line for the second partial coolant line 41 and a dashed line for the first partial coolant line 31). The second operating state is implemented if only the electric drive and the electronic components correspondingly provided for controlling same require cooling. For this purpose, the third pump 42 is activated by way of a signal from the control device 50. The second pump 32 remains inactive, such that no coolant flows through the first partial coolant circuit 30.

FIG. 1 corresponds to a third operating state of the cooling system 1 according to the disclosure, in which flow passes through both partial coolant circuits 30, 40. The third operating state is implemented if both the electronic components provided for controlling the fuel cells require cooling and the electric drive and the electronic components correspondingly provided for controlling same also require cooling. For this purpose, the second pump 32 and the third pump 42 are correspondingly activated by way of a signal from the control device 50.

In a method for cooling electrotechnical components in an electrically powered vehicle having a cooling system 1 according to FIG. 1, in a first step S1, the temperatures of the components in the first partial coolant circuit 30 and in the second partial coolant circuit 40 are detected. In a second step S2, the second pump 32 is activated if the component temperatures in the first partial coolant circuit 30 exceed a threshold value. In this case, the first operating state of the cooling system 1 is activated.

In a third step S3, the third pump is activated if the component temperatures in the second partial coolant circuit 40 exceed a threshold value. In this case, the second operating state of the cooling system 1 is activated.

Steps S2 and S3 take place at the same time. Here, the third operating state of the cooling system 1 may also be activated if the component temperatures in the first partial coolant circuit 30 and in the second partial coolant circuit 40 exceed a threshold value. For this purpose, the second pump 32 and the third pump 42 are activated.

While representative embodiments are described above, it is not intended that these embodiments describe all possible forms of a cooling system, electrified vehicle, or method of controlling a cooling system according to the disclosure. The words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A fuel cell vehicle comprising:
at least one fuel cell;
an electric machine powered by the at least one fuel cell;
a controller and first associated electronic components configured to control the at least one fuel cell;
second associated electronic components configured to control the electric machine;
a first coolant circuit having a first pump configured to circulate coolant through the at least one fuel cell; and
a second coolant circuit configured to circulate coolant through the first and second associated electronic components, the second coolant circuit including a first partial coolant circuit having a second pump configured to circulate coolant through the first associated electronic components, and a second partial coolant circuit having a third pump configured to circulate coolant through the second associated electronic components.

2. The fuel cell vehicle of claim 1 further comprising a first check valve arranged between an inlet of the first partial coolant circuit and an inlet of the second partial coolant circuit.

3. The fuel cell vehicle of claim 2 further comprising a second check valve arranged between an outlet of the first partial coolant circuit and an outlet of the second partial coolant circuit.

4. The fuel cell vehicle of claim 1 further comprising a throttle arranged in the first partial coolant circuit.

5. The fuel cell vehicle of claim 4 further comprising a fuel cell power distributor, wherein the throttle is arranged in a parallel coolant flow path with coolant flow through the fuel cell power distributor.

6. The fuel cell vehicle of claim 1 wherein the first coolant circuit is a high-temperature circuit and the second coolant circuit is a low-temperature circuit.

7. The fuel cell vehicle of claim 1 further comprising:
a first radiator fluidly coupled to the first coolant circuit; and
a second radiator fluidly coupled to the second coolant circuit.

8. The fuel cell vehicle of claim 7 wherein the first coolant circuit further comprises a three-way bypass valve that bypasses the first radiator responsive to coolant temperature being below a predetermined temperature.

9. The fuel cell vehicle of claim 1 wherein the first associated electronics comprises a first DC voltage converter electrically connected to the at least one fuel cell and a second DC voltage converter electrically connected to a traction battery of the fuel cell vehicle.

10. The fuel cell vehicle of claim 1 further comprising a DC voltage converter for the at least one fuel cell, a DC voltage converter for a vehicle traction battery, a power distributor for the at least one fuel cell, a compressor controller, and an electrical compressor within the first partial coolant circuit.

11. The fuel cell vehicle of claim 10 wherein downstream of the DC voltage converter for the vehicle traction battery, the first partial coolant circuit branches into at least a first section and a second section such that the power distributor is arranged in the first section, and the compressor controller and the electrical compressor are arranged in the second section.

12. The fuel cell vehicle of claim 11 further comprising a throttle positioned in the first section.

13. A fuel cell vehicle comprising:
at least one fuel cell;
an electric machine powered by the at least one fuel cell;
a controller and first associated electronic components configured to control the at least one fuel cell;
second associated electronic components configured to control the electric machine;
a first coolant circuit having a first pump configured to circulate coolant through the at least one fuel cell;
a second coolant circuit configured to circulate coolant through the first and second associated electronic components, the second coolant circuit including a first partial coolant circuit having a second pump configured to circulate coolant through the first associated electronic components, and a second partial coolant circuit having a third pump configured to circulate coolant through the second associated electronic components;
a first check valve disposed between an inlet of the first partial coolant circuit and an inlet of the second partial coolant circuit; and
a second check valve disposed between an outlet of the first partial coolant circuit and an outlet of the second partial coolant circuit.

14. The fuel cell vehicle of claim 13 further comprising a DC voltage converter for the at least one fuel cell, a DC voltage converter for a vehicle traction battery, a power distributor for the at least one fuel cell, a compressor controller, and an electrical compressor, within the first partial coolant circuit.

15. The fuel cell vehicle of claim 14 wherein the first partial coolant circuit includes first and second branches downstream of the second pump, the first branch configured to providing coolant to the power distributor and the second branch including a throttle.

*   *   *   *   *